United States Patent [19]
Kanai

[11] Patent Number: 5,386,589
[45] Date of Patent: Jan. 31, 1995

[54] TRANSMISSION POWER CONTROL SYSTEM CAPABLE OF KEEPING SIGNAL QUALITY CONSTANT IN MOBILE COMMUNICATION NETWORK

[75] Inventor: Toshihito Kanai, Tokyo, Japan

[73] Assignee: NEC Corporation, Tokyo, Japan

[21] Appl. No.: 996,157

[22] Filed: Dec. 23, 1993

[30] Foreign Application Priority Data

Dec. 26, 1991 [JP] Japan .................. 3-345625

[51] Int. Cl.⁶ ............... H04Q 7/00; H04B 7/00
[52] U.S. Cl. .................... 455/33.1; 455/69; 455/88
[58] Field of Search ............ 455/69, 67.1, 115, 73, 455/63, 68, 70, 88, 54.1, 56.1, 33.1, 226.2, 226.3, 67.3; 375/76; 379/58, 63, 59, 60

[56] References Cited

U.S. PATENT DOCUMENTS

| | | | |
|---|---|---|---|
| 4,309,771 | 1/1982 | Wilkens ..................... | 455/69 |
| 4,580,262 | 4/1986 | Naylor et al. ............... | 455/69 |
| 4,777,653 | 10/1988 | Bonnerot et al. ........... | 455/69 |
| 4,991,184 | 2/1991 | Hashimoto ................. | 455/69 |
| 5,056,109 | 10/1991 | Gilhousen et al. ......... | 455/69 |
| 5,128,965 | 7/1992 | Henriksson ................ | 455/69 |

FOREIGN PATENT DOCUMENTS

| | | | |
|---|---|---|---|
| 0289324 | 11/1989 | Japan ........................ | 455/69 |
| 0127519 | 5/1991 | Japan ........................ | 455/69 |

OTHER PUBLICATIONS

A. N. Rosenberg, "Simulation of Power Control and Voice-Channel Selection in Cellular Systems", 35th IEEE Vehicular Technology Conference, Colorado, May 1985, pp. 12–15.

S. Kozono et al., "Cochannel Interference Measurement in Mobile Radio Systems", 35th IEEE Vehicular Technology Conference, May 1985, pp. 60–66.

T. Fujii et al., "Reduction of Cochannel Interference in Cellular Systems ... Power Control", 38th IEEE Vehicular Technology Conference, Jun. 1988, pp. 668–672.

*Primary Examiner*—Curtis Kuntz
*Assistant Examiner*—Nguyen Vo
*Attorney, Agent, or Firm*—Sughrue, Mion, Zinn, Macpeak & Seas

[57] ABSTRACT

In order to provide for a mobile communication network of a cellular type a transmission power control system capable of keeping a signal quality constant, an average bit error rate y is measured on a receiving side in connection with a communication channel being in use (step 100). If the average bit error rate y is not greater than a first rate threshold value LV1, transmission power is decreased by a predetermined amount on a transmitting side (step 102). If the average bit error rate y is not less than a second rate threshold value LV2 which is greater than the first rate threshold value LV1 (step 103), the transmission power is increased by the predetermined amount on the transmitting side (step 104). Preferably, an average reception level is additionally measured to adjust the transmission power when the bit error rate is less or greater than the first or the second rate threshold value. The first and/or the second rate threshold value is adaptively adjusted by counting the number of times by which the bit error rate exceeds a predetermined maximum allowable rate. It is possible to use an average carrier to interference ratio with threshold ratio values substituted for the threshold rate values and with a predetermined minimum allowable ratio used.

2 Claims, 9 Drawing Sheets

TRANSMISSION POWER CONTROL SYSTEM CAPABLE OF KEEPING SIGNAL QUALITY CONSTANT IN MOBILE COMMUNICATION NETWORK

BACKGROUND OF THE INVENTION

This invention relates to a transmission power control system for a mobile communication network of a cellular type.

For a large-capacity mobile communication network, such as an automobile telephone network, a service area is composed of a plurality of radio or wireless zones (herein called cells). In each of the cells, a base station comprises a transmitter and a receiver to establish a radio communication channel for carrying out a bidirectional communication with a mobile station comprising a transmitter and a receiver. Such a network is said to be of a cellular type.

The transmitters of the base station and the mobile station have a maximum transmission power capable of sufficiently providing a signal to noise ratio (hereafter called a CNR) and a carrier to interference power ratio (hereafter called a CIR) even when the mobile station is near a boundary between the cells. It consequently results that each transmitter uses the transmission power beyond necessity when the mobile station is present near the base station. In order to avoid such waste of the power and to suppress an average power consumption, use is made of a technique of controlling the transmission power of each transmitter to make the base station and the mobile station have a reception level kept constant. This technique is called transmission power control (or power control) and is used in the automobile telephone network.

A conventional transmission power control system of keeping a reception power level constant is disclosed in a report contributed by Teruya FUJII and Masayuki SAKAMOTO to Conference Record of 38th IEEE Vehicular Technology Conference, June, 1988, pages 668–672, under the title of "Reduction of Cochannel Interference in Cellular Systems by Intra-Zone Channel Reassignment and Adaptive Transmitter Power Control" and in another report contributed by A. N. Rosenberg to Conference Record of 35th IEEE Vehicular Technology Conference, Colorado, May 1985, pages 12–15, under the title of "Simulation of Power Control and Voice-Channel Selection in Cellular Systems".

In the conventional transmission power control system of keeping a reception power level constant, the transmission power is kept constant despite an increase in an interference level. As a result, a deterioration is liable to frequently occur in a signal quality.

SUMMARY OF THE INVENTION

It is therefore an object of the present invention to provide a transmission power control system capable of keeping a signal quality constant.

Other objects of this invention will become clear as the description proceeds.

On describing the gist of this invention, it is possible to understand that a transmission power control system is for a mobile communication network which is of a cellular type having a service area divided into a plurality of cells and comprises in each of the cells a base station comprising a transmitter and a receiver to establish in the above-mentioned each of the cells a radio communication channel for carrying out communication between the base station and a mobile station comprising a transmitter and a receiver, with one and the other of the base and the mobile stations used as a transmitting station and as a counterpart station.

According to a first aspect of this invention, the above-understood transmission power control system comprises in the receiver of the counterpart station: first means for detecting a bit error rate of a signal received from the transmitter of the transmitting station; and second means for decreasing transmission power of the transmitter of the transmitting station by a predetermined amount if the bit error rate is not greater than a first rate threshold value. The second means increases the transmission power of the transmitting station by the predetermined amount if the bit error rate is not less than a second rate threshold value which is greater than the first rate threshold value by a preselected difference.

According to a second aspect of this invention, the above-understood transmission power control system comprises in the receiver of the counterpart station: first means for detecting a carrier to interference ratio of a signal received from the transmitter of the transmitting station; and second means for decreasing transmission power of the transmitter of the transmitting station by a predetermined amount if the carrier to interference ratio is not less than a first ratio threshold value. The second means increases the transmission power of the transmitter of the transmitting station by the predetermined amount if the carrier to interference ratio is not greater than a second ratio threshold value which is less than the first ratio threshold value by a preselected difference.

For a mobile communication network for digital communication, a signal quality is indicated by a bit error rate. In connection with a radio or wireless communication channel being used, the bit error rate is readily measured by transmitting through the communication channel a bit sequence having a predetermined pattern. According to the first aspect of this invention, the bit error rate is used to indicate the signal quality. When only a negligible influence is given rise to by an intersymbol interference (ISI) caused by multi-path propagation, a bit error arises from noise and an interference signal. Consequently, the bit error rate is improved by an increase in the transmission power. The bit error rate tends to deteriorate when the transmission power is reduced. The transmission power of the transmitter is therefore decreased by a predetermined amount if the bit error rate is not greater than the first rate threshold value. The transmission power of the transmitter is increased by the predetermined amount if the bit error rate is not less than the second rate threshold value. In almost all cases, such a control makes it possible to keep the bit error rate between the first and the second rate threshold values and to keep the signal quality substantially constant.

Preferably, the first and the second rate threshold values are adaptively determined. In order to carry out communication with no trouble, the bit error rate should be kept during the communication below a certain value. This value is referred to herein as a maximum allowable bit error rate. In order to keep the bit error rate throughout the communication below the maximum allowable bit error rate, the first and the second rate threshold values must have a smaller value than the maximum allowable bit error rate. It is, however, useless to render the first and the second rate threshold values excessively small and to insure the signal quality more than necessity. In order to optimally determine the first and the second rate threshold values, it well serves with measurement carried out of the number of times of deterioration in the signal quality, namely, of the number of times by which the bit error rate of a radio transmission channel in use exceeds the maximum allowable bit error rate in each predetermined time interval that at least one of the first and the second rate threshold values be decreased by a prescribed value if the number of times is not less than a value indicative of deterioration of the signal quality and that the above-mentioned one of the first and the second rate threshold values be increased by the prescribed value if the number of times is less than the value indicative of deterioration of the signal quality. The prescribed value is less than the preselected difference.

When the deterioration results dominantly from a co-channel interference, it is possible to use in place of the bit error rate the CIR as an indication of the signal quality. For measurement of the CIR of a radio communication channel in use, is a known method of using a beat phenomenon in the manner described in a report contributed by Shigeru KOZONO and Masayuki SAKAMOTO to Conference Record of 35th IEEE Vehicular Technology Conference, May 1985, pages 60–66, under the title of "Cochannel Interference Measurement in Mobile Radio Systems". According to the second aspect of this invention, the CIR is used to indicate the signal quality. Naturally, the CIR is improved with an increase in the transmission power. The CIR deteriorates with a decrease in the transmission power. As a consequence, the transmission power of a transmitter is decreased by the predetermined amount if the CIR is measured by a receiver to be not less than the first ratio threshold value. The transmission power of the transmitter is increased by the predetermined amount if the CIR is not greater than the second ratio threshold value. In almost all cases, such a control makes it possible to keep the CIR between the first and the second ratio threshold values and to keep the signal quality substantially constant.

Preferably, the first and the second ratio threshold values are adaptively determined. In order to carry out communication with no problem, the CIR should be kept during the communication above a certain value. This value is herein called a minimum allowable CIR. In order to keep the CIR throughout the communication above the minimum allowable CIR, the first and the second ratio threshold values must have a value greater than the minimum allowable CIR. It is, however, of no use to render the first and the second ratio threshold values excessively great and to insure the signal quality beyond necessity. In order to optimally determine the first and the second ratio threshold values, it serves well with measurement carried out of the number of times of deterioration in the signal quality, namely, of the number of times by which the CIR of a radio communication channel in use is below the minimum allowable CIR that at least one of the first and the second ratio threshold values be increased by a prescribed value if the number of times is not less than a value indicative of deterioration of the signal quality and that the above-mentioned one of the first and the second ratio threshold values be decreased by the prescribed value if the number of times is less than the value indicative of deterioration of the signal quality. The prescribed value is less than the preselected difference.

Attention will be directed to determination of a minimum value for a reception level of the signal received in the receiver of the counterpart station. According to the first and the second aspects of this invention, the reception level may have whatever a value insofar as a predetermined signal quality is obtained. An increase, however, occurs in a liability of deterioration by noise and/or by an interference signal when the reception level is lower. It is therefore desirable in practical implementation to keep the reception level above a predetermined minimum level with a predetermined signal quality maintained. From this viewpoint, a decrease of the transmission power is preferably allowed only when the reception level is not less than the predetermined minimum level.

Attention will also be directed to determination of a maximum value for the reception level. According to the first and the second aspects of this invention, the reception level may have whatever a value insofar as a predetermined signal quality is obtained. It is, however, liable when the reception level is excessively high that a problem arises at the receiver of the base station from intermodulation and/or interference between adjacent channels. It is therefore desirable in practical implementation to keep the reception level below a predetermined maximum level with the predetermined signal quality insured. From this viewpoint, an increase of the transmission power is preferably allowed only when the reception level is not greater than the predetermined maximum level.

DESCRIPTION OF THE PREFERRED EMBODIMENTS

Figure 1:
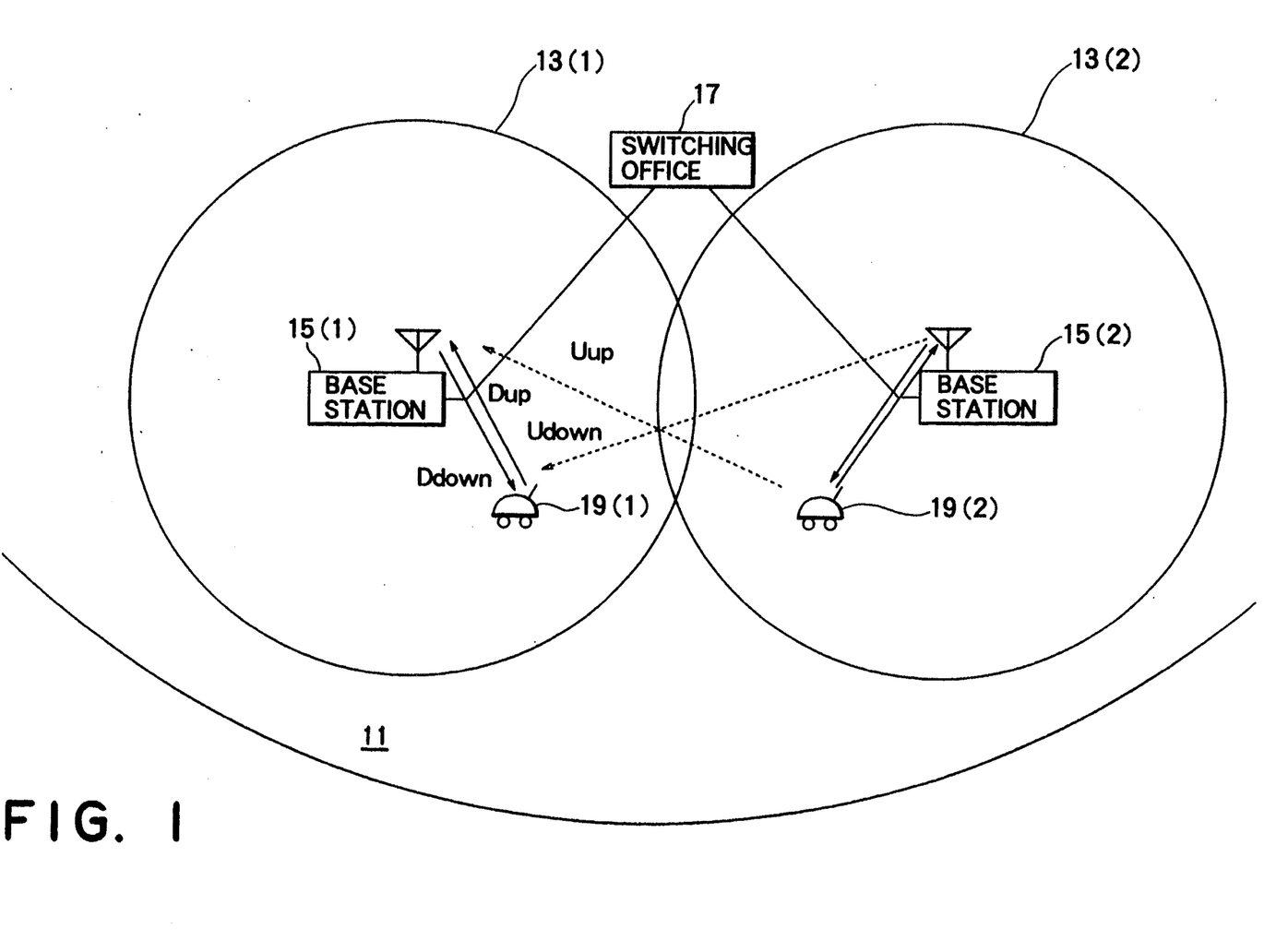
FIG. 1 is a diagram for use in describing a general mobile communication network.

Referring to FIG. 1, attention will first be directed to a general mobile communication network of a cellular type. In the manner which is described above and will become clear as the description proceeds, a transmission power control system is used in the mobile communication network.

The mobile communication network has a service area 11. Inasmuch as the mobile communication network is of the cellular type, the service area 11 is divided into a plurality of cells, such as first and second cells 13(1) and 13(2). In the example being illustrated, the cells 13 (suffixes omitted) are circular in shape and partly overlaps on one another.

The mobile communication network comprises a plurality of base stations, such as first and second base stations 15(1) and 15(2). In the example, the base stations 15 (suffixes omitted) are individually situated in the cells 13 as cell sites. Each base station 15 is depicted as having an omnidirectional antenna. The base stations 15 are connected to a switching or exchange office 17 of a public telephone and/or data communication network.

A plurality of mobile stations, such as first and second mobile stations 19(1) and 19(2), are movable in the service area 11. In FIG. 1, the mobile stations 19 (suffixes omitted) are depicted as automobiles. Each mobile station 19 is therefore a telephone substation installed on an automobile. Alternatively, each mobile station 19 may be either a portable radio telephone set or a telephone and data terminal equipment installed on a mobile vehicle. Each mobile station 19 may be stationary in one of the cells 13 or may move from one of the cells 13 to another cell 13. In the example, the first and the second mobile stations 19 are currently present in the first and the second cells 13.

In each cell 13, the base station 15 exchanges communication with the mobile station or stations 19 which are currently present in the cell 13 under consideration. Each cell 13 is consequently referred to alternatively as a radio zone.

In FIG. 1, it will be assumed that the first and the second base stations 15 are exchanging communication with the first and the second mobile stations 19, respectively, through radio communication channels of a common frequency. Such communication channels are depicted by solid lines, each with an arrowhead.

It will be observed that radio signals are transmitted also between the first base station 15(1) and the second mobile station 19(2) and between the second base station 15(2) and the first mobile station 19(1). The first base station 15(1) will be taken into consideration. In this event, the radio signal directed to the first mobile station 19(1) is herein called a down desired signal and has a down desired level Ddown at the first mobile station 19(1). When directed from the first mobile station 19(1), the radio signal is called an up desired signal and has an up desired level Dup at the first base station 15(1). When directed from the second mobile station 19(2), the radio signal is an up interference signal and has an up interference level Uup at the first base station 15(1). When directed from the second base station 15(2), the radio signal is a down interference signal and has a down interference level Udown at the first mobile station 19(1).

Attention will be directed to the down desired signal. In this case, the first base station 15(1) is a transmitting station transmitting the down desired signal to the first mobile station 19(1) with the first mobile station 19(1) selected as a counterpart station. The up desired signal will be taken into consideration. In this latter case, the first mobile station 19(1) is a transmitting station with the first base station 15 used as a counterpart station.

Figure 2:
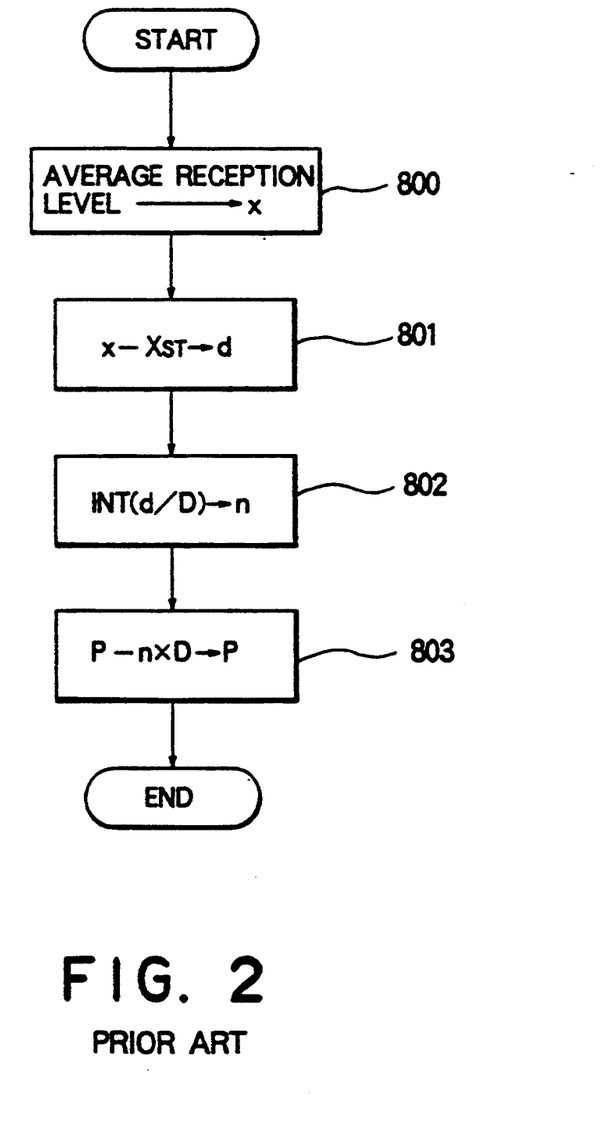
FIG. 2 is a flow chart for use in describing a conventional transmission power control system.

Turning to FIG. 2, the description will proceed to a conventional transmission power control system which is disclosed by Teruya FUJII et al report described above. The conventional transmission power control system is for controlling a transmission power of each transmitter to make the base station and the mobile station have a reception level kept constant in order to avoid waste of the power and to suppress an average power consumption.

FIG. 2 shows a practical algorithm. At the base station (the mobile station), an average value of the reception level is measured in each predetermined time interval and is represented by x (step 800). A difference is detected between this average reception level x and a control setting level Xst and is designated by d (step 801). Next, the difference d is quantized by a control step width D to calculate n (step 802). This result is reported to the mobile station (the base station). At the mobile station (the base station), the transmission power P is decreased by (n×D) based on the reported value of n (step 803). By periodically repeating this control, it is possible to keep the average reception level near the control setting level Xst at the base station (the mobile station).

Inasmuch as the conventional transmission power control system keeps a reception power level constant, the transmission power is kept constant despite an increase in an interference level. As a consequence, a deterioration is liable to frequently occur in a signal quality as described above.

Figure 3:
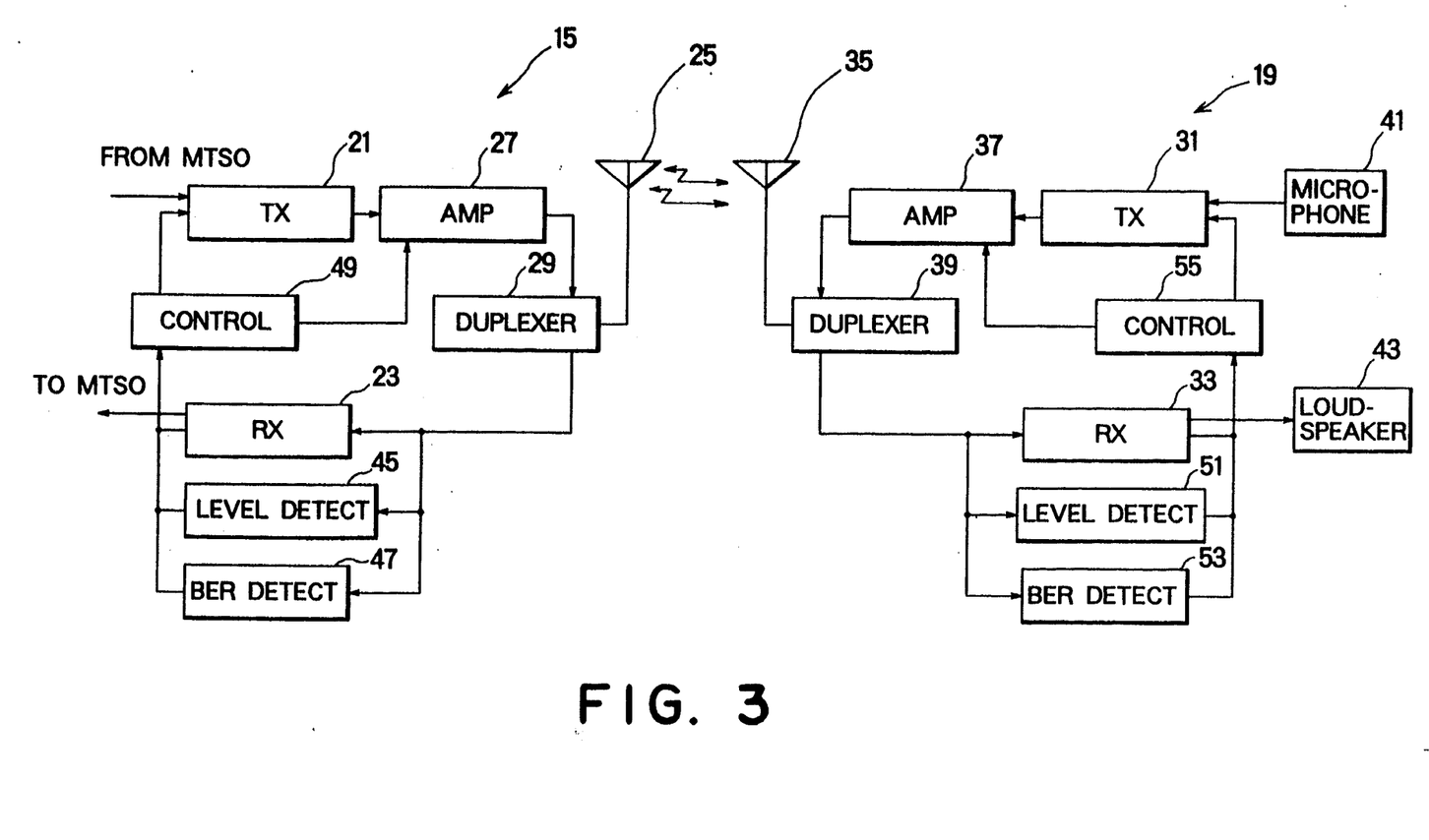
FIG. 3 is a block diagram of a pair of base and mobile stations for carrying out a transmission power control system of this invention.

Referring to FIG. 3, a transmission power control system of this invention is included in each pair of a base station 15 and a mobile station 19. The base station 15 comprises a base transmitter (TX) 21 and a base receiver (RX) 23. The base transmitter 21 is connected to a base antenna 25 through a base amplifier (AMP) 27 and a base duplexer 29. The base receiver 23 is connected to the base antenna 25 through the base duplexer 29.

The mobile station 19 comprises a mobile transmitter 31 and a mobile receiver 33. The mobile transmitter 31 is connected to a mobile antenna 35 through a mobile amplifier 37 and a mobile duplexer 39. The mobile receiver 33 is connected to the mobile antenna 35 through the mobile duplexer 39.

Each of the base and the mobile amplifiers 27 and 37 is a controllable amplifier. The mobile transmitter 31 is connected to a microphone 41. The mobile receiver 33 is connected to a loudspeaker 43. The base transmitter and receiver 21 and 23 are connected to a mobile telephone switching office which may be the switching office 17 described in conjunction with FIG. 1 and is represented by an acronym MTSO in the art.

It will be surmised that the mobile communication network deals with a voice signal alone merely for brevity of the description. From the mobile telephone switching office, a base transmission voice signal is supplied to the base transmitter 21 and is modulated into a base radio frequency signal. The base amplifier 27 amplifies the base radio frequency signal into a down radio signal having a base transmission power. The base antenna 25 transmits the down radio signal to the cell or the radio zone 13 described in conjunction with FIG. 1.

It will be presumed that the mobile station 19 is present in the cell in which the base station 15 in question is situated. The down radio signal is caught by the mobile antenna 35 as the down desired signal mentioned in connection with FIG. 1. The down desired signal is demodulated by the mobile receiver 33 and is supplied to the loudspeaker 43.

From the microphone 41, a mobile voice signal is delivered to the base transmitter 31 and is modulated into a mobile radio frequency signal. The mobile amplifier 37 amplifies the mobile radio frequency signal into an up radio signal having a mobile transmission power. The mobile antenna 35 transmits the up radio signal to the base station 15.

The base antenna 25 receives the up radio signal as the up desired signal which is described in conjunction with FIG. 1 and is sent to the base receiver 23. Demodulating the up desired signal, the base receiver 23 delivers a base reception voice signal to the mobile telephone switching office. It will now be surmised that each of the down and the up radio signals carries a digital signal and is transmitted through a radio communication channel.

Through the base duplexer 29, the up desired signal is supplied to a base level detector 45 and to a base bit error rate (BER) detector 47. The base level detector 45 and rate detector 47 are connected to a base controller 49, which controls the base amplifier 27. Depending on the circumstances, a base carrier to interference ratio (CIR) detector is substituted for the rate detector 47. If necessary, the ratio detector will be designated by the reference numeral 47.

Through the mobile duplexer 39, the down desired signal is delivered to a mobile level detector 51 and to a mobile bit error rate detector 53. The mobile level detector 51 and bit error detector 53 are connected to a mobile controller 55, which controls the mobile amplifier 37. When the base carrier to interference ratio detector 47 is used, a mobile carrier to interference ratio detector is substituted for the mobile bit error rate detector 53. The mobile carrier to interference ratio detector will be denoted, if necessary, by the reference numeral 53.

Each of the level detectors 45 and 51 is for detecting or measuring an average reception level in each predetermined time interval t in connection with a radio communication channel being used. Each of the bit error rate detectors 47 and 53 is for detecting or measuring an average bit error rate in the predetermined time interval. t with respect to the communication channel in use. Each of the carrier to interference ratio detectors 47 and 53 is for detecting or measuring an average carrier to interference ratio with regard to the communication channel in service.

Figure 4:
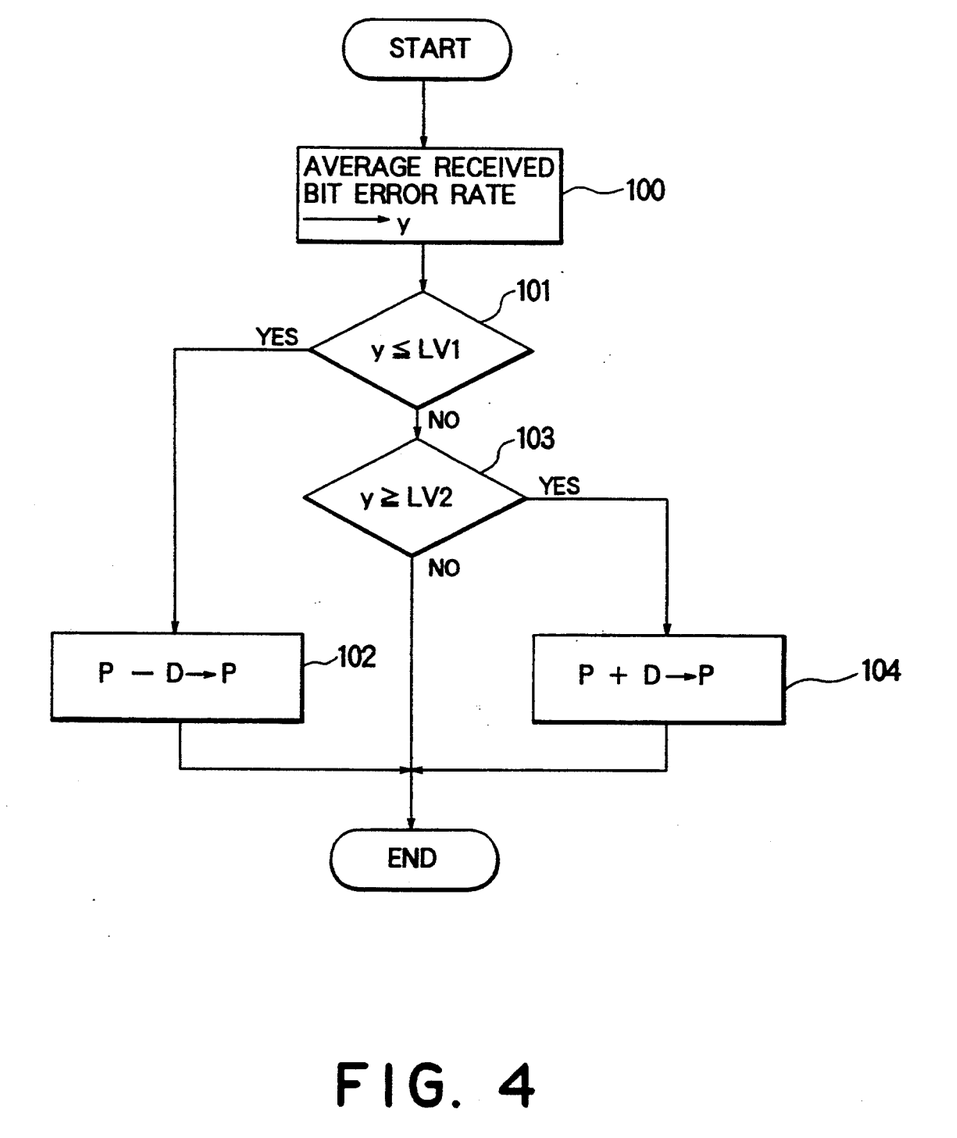
FIG. 4 is a flow chart for use in describing a transmission power control system according to a first embodiment of this invention.

Turning to FIG. 4, the description will proceed to a transmission power control system according to a first embodiment of this invention. In FIG. 4, control is carried out periodically either in the base station or the mobile station which stations are carrying out communication with one and the other used as a transmitting station and a counterpart station. First, the base station (the mobile station) detects an average bit error rate in a predetermined time interval t in connection with a radio communication channel being used to represent it by y (step 100). Next, the base station (the mobile station) compares the average bit error rate y with a first rate threshold value (hereafter abbreviated to LV1) (step 101). If a result indicates that the average bit error rate y is not greater than the LV1, the base station (the mobile station) transmits towards the mobile station (the base station) a command for decreasing its transmission power P. Receiving the command, the base station (the mobile station) immediately reduces the transmission power P by a predetermined control step width D (step 102). If the average bit error rate y exceeds the LV1 at the step 101, the base station (the mobile station) compares the average bit error rate y with a second rate threshold level (hereafter abbreviated to LV2) (step 103). The LV2 is greater than the LV1 by a preselected difference. If a result shows that the average bit error rate y is not less than the LV2, a command is sent to the mobile station (the base station) to increase the transmission power P. Receiving this command, the mobile station (the base station) immediately increases its transmission power P by the predetermined control step width D (step 104). If the average bit error rate y exceeds the LV1 and is below the LV2, the base station (the mobile station) does nothing. The control comes to an end. It is possible by the control of FIG. 4 to keep the average bit error rate y between the LV1 and the LV2.

Reviewing FIGS. 2 and 4, it is now understood that the bit error rate detector 47 or 53 detects the average bit error rate y. A combination of the amplifier 27 or 37 and the controller 49 or 55 decreases and increases the transmission power P if the average bit error rate y is not greater than the first rate threshold value LV1 and is not less than the second rate threshold value LV2 at the counterpart station. Under the circumstances, it is possible to keep the reception level detector 45 or 51 out of operation.

Figure 5:
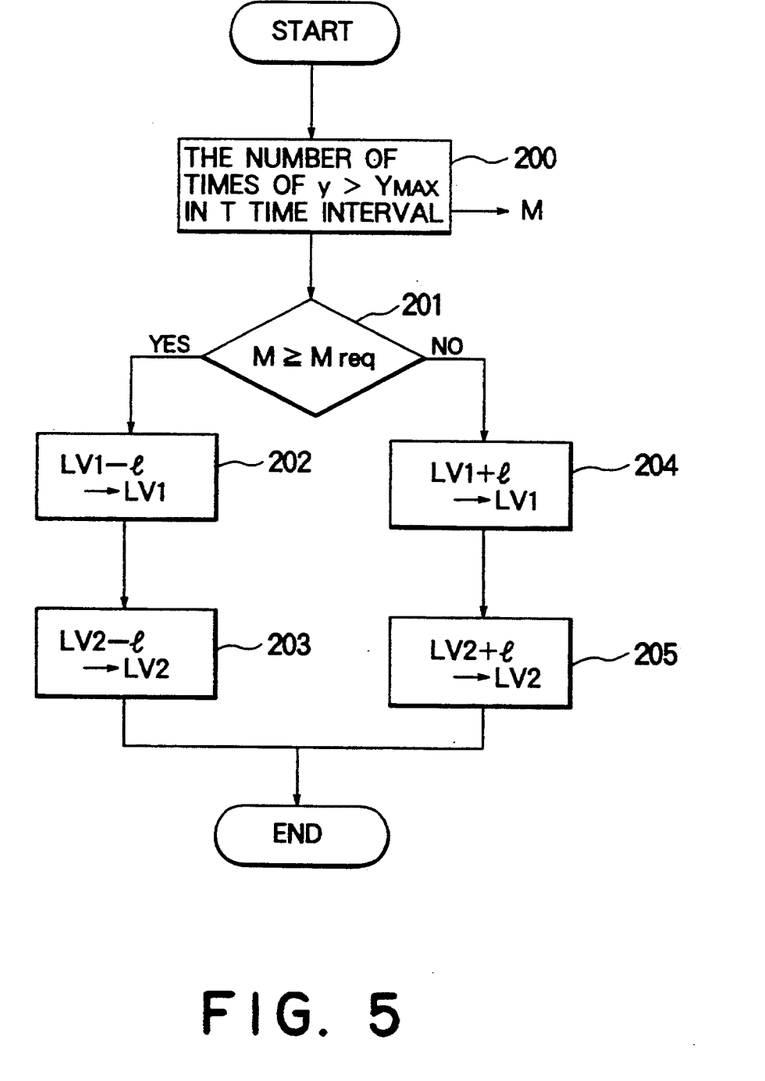
FIG. 5 is a flow chart for use in describing a transmission power control system according to a second embodiment of this invention.

Turning to FIG. 5, the description will proceed to a transmission power control system according to a second embodiment of this invention. With an optional time interval T, the base station (the mobile station) measures the number of times which is designated by M and by which a maximum allowable bit error rate $Y_{MAX}$ is exceeded by an average bit error rate y in a time interval t which is shorter than the time interval T (step 200). This deteriorating number of times M is compared with a predetermined normal value Mreq (step 201). If the deteriorating number of times M is not less than the normal value Mreq, the first rate threshold value (LV1) and the second rate threshold value (LV2) are decreased by a prescribed value l (steps 202 and 203). The prescribed value l is less than the preselected difference. If the deteriorating number of times M is less than the normal value Mreq, the LV1 and the LV2 are increased by the prescribed value l (steps 204 and 205). Although the LV1 and the LV2 are both decreased or increased in FIG. 5, only one of the threshold values may be decreased or increased by the prescribed value. By this control, it is possible to always keep a predetermined deteriorating number of times because the first rate threshold value and the second rate threshold value are decreased when the deteriorating number of times is great and because the first rate threshold value and the second rate threshold value are increased when the deteriorating number of times is small.

Reviewing FIGS. 2 and 5, the bit error rate detector 47 or 53 detects the average bit error rate y in the manner described in the foregoing. It is now possible to understand that the bit error rate detector 47 or 53 is furthermore operable to detect or calculate the number of times M by which the average bit error rate y exceeds the maximum allowable bit error rate $Y_{MAX}$. It is readily possible to make the bit error rate detector 47 or 53 so operate by inclusion therein of a comparator and a counter (both not shown). The bit error rate detector 47 or 53 additionally controls the controller 49 or 55 to decrease and increase at least one of the first and the second rate threshold values LV1 and LV2 into first and/or second adaptively adjusted rate threshold values (LV1+l) and/or (LV2+l). It is readily possible to make the controller 49 or 53 so adjust the first and/or the second rate threshold values LV1 and/or LV2 by using therein either a read-only memory (not shown) or a combination of an adder/subtracter (not shown) and a memory (not shown) for memorizing the predetermined value l. The combination of the amplifier 27 or 37 and the controller 49 or 55 now decreases and increases the transmission power P if the average bit error rate y is not greater than the first adaptively adjusted rate threshold value (LV1+l) and is not less than the second adaptively adjusted rate threshold value (LV2+l) at the counterpart station. In these events, the reception level detector 45 or 51 may be kept out of operation.

Figure 6:
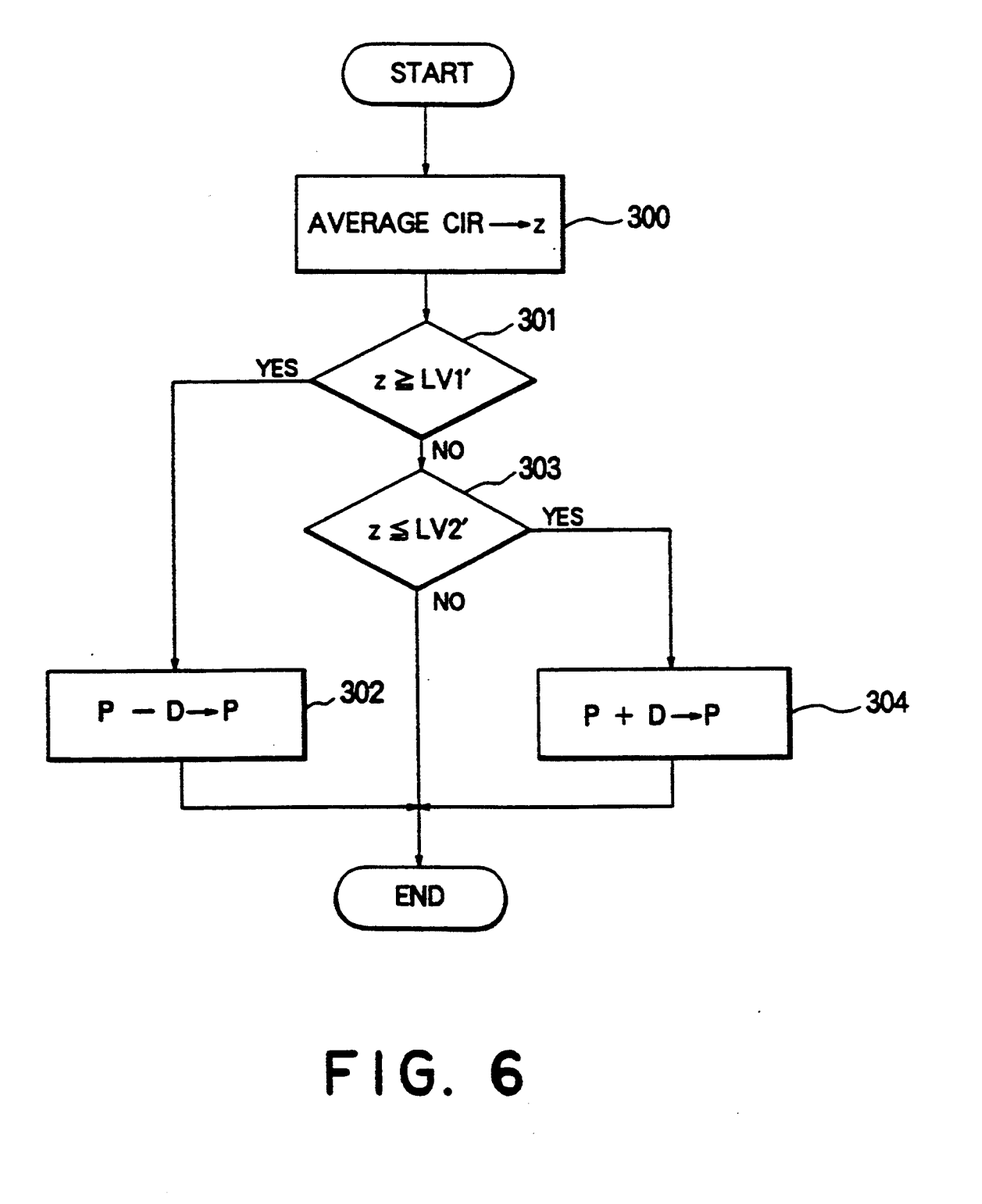
FIG. 6 is a flow chart for use in describing a transmission power control system according to a third embodiment of this invention.

Turning to FIG. 6, the description will proceed to a transmission power control system according to a third embodiment of this invention. In FIG. 6, control is carried out periodically in the base station and the mobile station which are exchanging communication. First, the base station (the mobile station) measures, as z, an average CIR in a predetermined time interval t in connection with a radio communication channel being used (step 300). Next, the base station (the mobile station) compares the average CIR with a first ratio threshold value (hereafter abbreviated to LV1') (step 301). If a result indicates that the average CIR is not less than the LV1', the base station (the mobile station) supplies the mobile station (the base station) with a command for decreasing its transmission power P. Receiving the command, the mobile station (the base station) immediately decreases the transmission power P by a predetermined control step width D (step 302). If the average CIR is less than the LV1' at the step 301, the base station (the mobile station) compares the average CIR with a second ratio threshold value (hereafter abbreviated to LV2') (step 303). The LV2' is less than the LV1' by a preselected difference. If a result shows that the average CIR is not greater than the LV2', another command is sent to the mobile station (the base station) to increase the transmission power P. Receiving this command, the mobile station (the base station) immediately increases its transmission power P by the predetermined control step width D (step 304). If the average CIR is less than the LV1' and is greater than the LV2', the base station (the mobile station) does nothing. The control comes to an end. The control of FIG. 6 makes it possible to keep the average CIR between the LV1' and the LV2'.

Reviewing FIGS. 2 and 6, it is understood that the carrier to interference ratio detector 47 or 53 detects the average carrier to interference ratio z. The combination of the amplifier 27 or 37 and the controller 49 or 55 now decreases and increases the transmission power P if the carrier to interference ratio is not less than the first ratio threshold value LV1' and is not greater than the second ratio threshold value LV2' at the counterpart station. In such cases, it is possible to put the reception level detector 45 or 51 out of operation.

Figure 7:
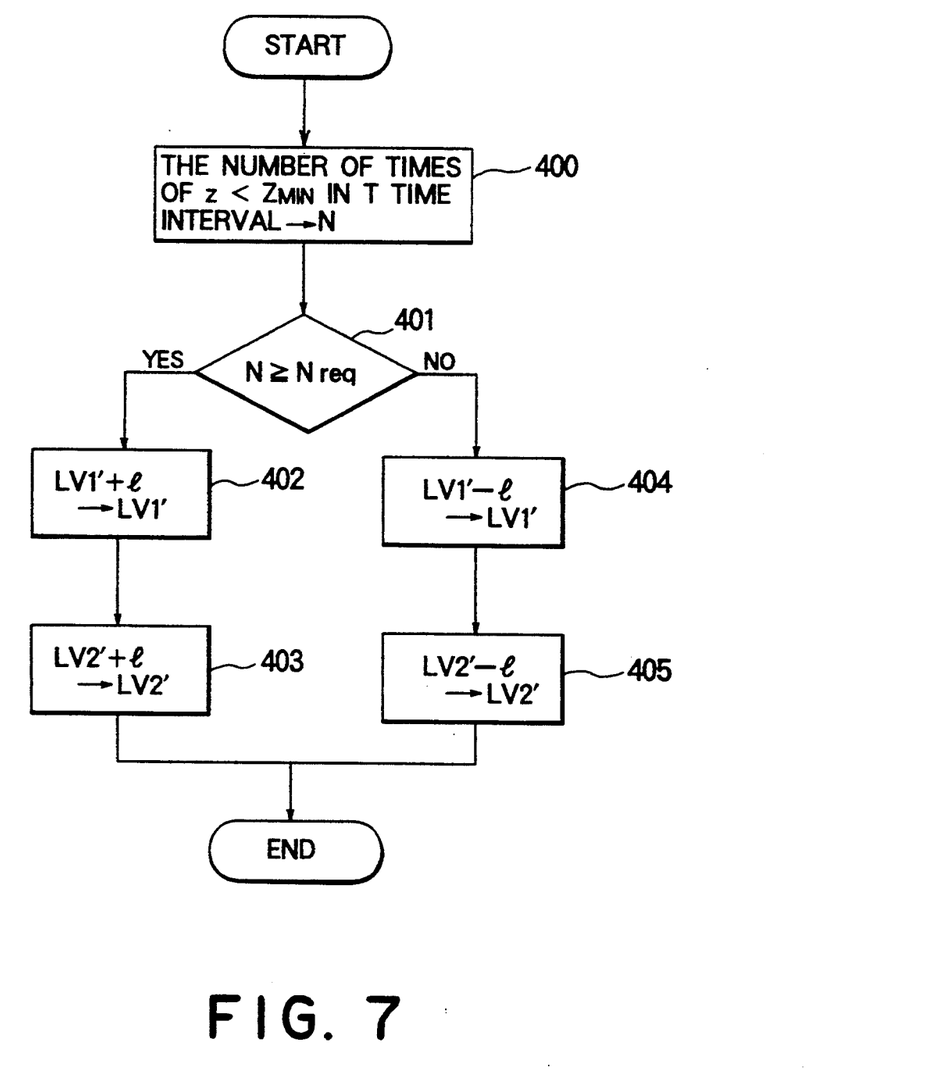
FIG. 7 is a flow chart for use in describing a transmission power control system according to a fourth embodiment of this invention.

Turning to FIG. 7, the description will proceed to a transmission power control system according to a fourth embodiment of this invention. With an optional time interval T, the base station (the mobile station) measures the number of times which is denoted by N and by which a minimum allowable CIR $Z_{MIN}$ is not exceeded by an average CIR in a time interval t which is shorter than the time interval T (step 400). This deteriorating number of times N is compared with a predetermined normal value Nreq (step 401). If the deteriorating number of times N is not less than the normal value Nreq, the first and the second ratio threshold values LV1' and LV2' are increased by a prescribed value l (steps 402 and 403). The prescribed value l is less than the preselected difference. If the deteriorating number of times N is less than the normal value Nreq, the LV1' and the LV2' are decreased by the prescribed value l (steps 404 and 405). Although the LV1' and the LV2' are both decreased or increased in FIG. 7, decrease or increase of only one of the first and the second ratio threshold values serves well. This control makes it possible to always keep a predetermined deteriorating number of times because the first ratio threshold value and the second ratio threshold value are increased when the deteriorating number of times is great and because the first ratio threshold value and the second ratio threshold value are decreased when the deteriorating number of times is small.

Reviewing FIGS. 2 and 7, the carrier to interference ratio detector 47 or 53 detects the average carrier to interference ratio as above. It is now possible to understand that the carrier to interference ratio detector 47 or 53 is additionally operable to detect or count the number of times N by which the average carrier to interference ratio z is below the minimum allowable carrier to interference ratio $Z_{MIN}$. It is readily possible to make the carrier to interference ratio detector 47 or 53 count the number of times N in the manner described in conjunction with the bit error rate detector 47 or 53 by reviewing FIGS. 2 and 5. The carrier to interference ratio detector 47 or 53 moreover controls the controller 49 or 55 to increase and decrease at least one of the first and the second ratio threshold values LV1' and LV2' into first and/or second adaptively adjusted ratio threshold values (LV1'±l) and/or (LV2'±l). The controller 49 or 55 is readily made so to adjust the first and/or the second ratio threshold values LV1' and/or LV2' as described by reviewing FIGS. 2 and 5. The combination of the amplifier 27 or 37 and the controller 49 or 53 now decreases and increases the transmission power P if the average carrier to interference ratio z is not less than the first adaptively adjusted ratio threshold value (LV1'±l) and is not greater than the second adaptively adjusted ratio threshold value (LV2'±l) at the counterpart station. Under the circumstances, the reception level detector 45 or 51 may be put out of operation.

Figure 8:
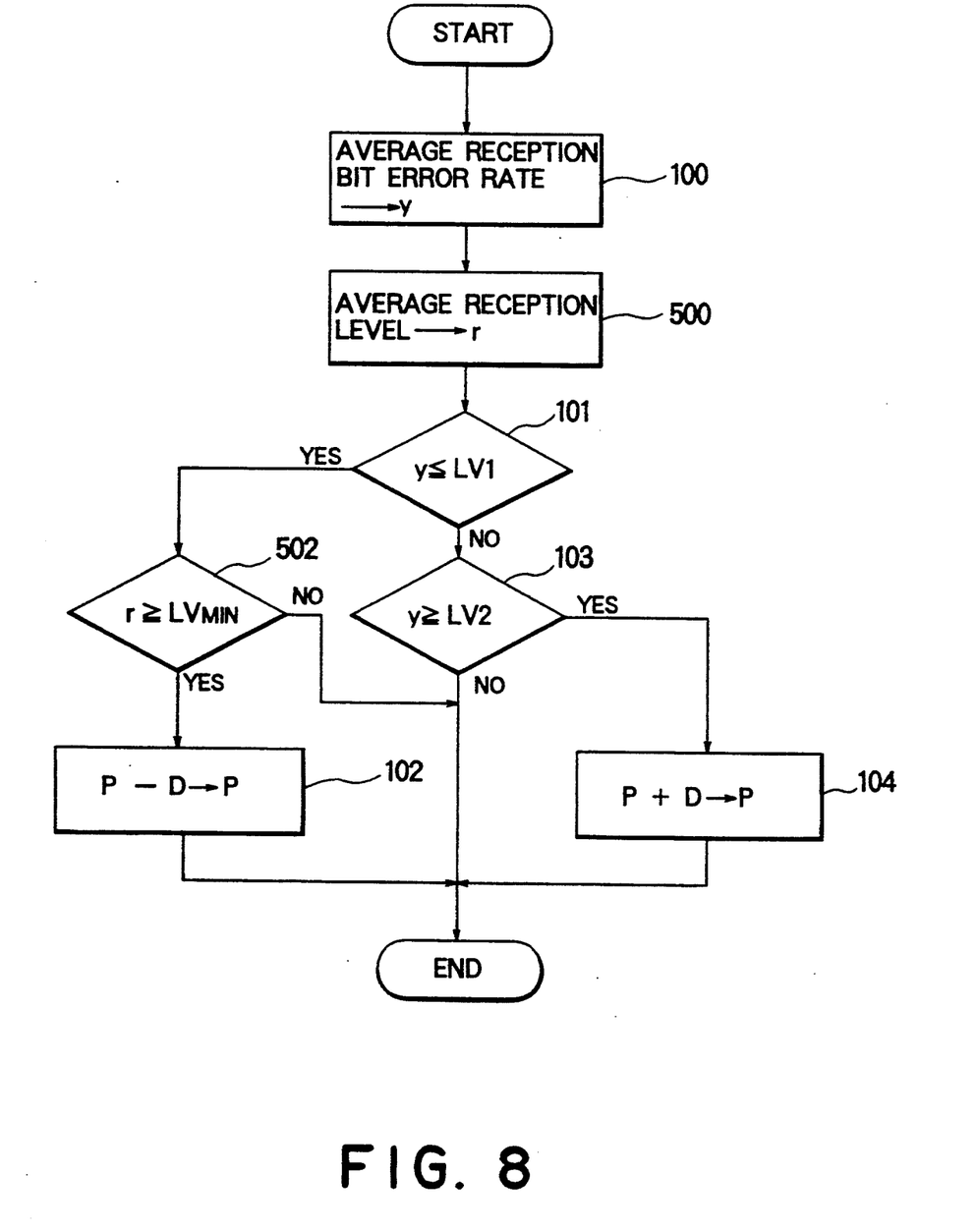
FIG. 8 is a flow chart for use in describing a transmission power control system according to a fifth embodiment of this invention.

Turning to FIG. 8, the description will proceed to a transmission power control system according to a fifth embodiment of this invention. In FIG. 8, the flow chart shows the fifth embodiment applied to the first embodiment illustrated with reference to FIG. 4. The fifth embodiment is likewise applicable to the third embodiment of FIG. 6. According to FIG. 8, control is carried out periodically by the base station and the mobile station which are exchanging communication. First, the base station (the mobile station) measures an average bit error rate in a predetermined time interval t in connection with a radio communication channel in use and designates it by y (step 100). Furthermore, the base station (the mobile station) measures an average reception level in the predetermined time interval t and denotes it by r (step 501). Next, the base station (the mobile station) compares the average bit error rate y with the first rate threshold value LV1 (step 101). If a result shows that the average bit error rate y is not greater than the LV1, the average reception level r is compared with a predetermined minimum level (hereafter abbreviated to $LV_{MIN}$) (step 502). If the average reception level r is not less than the $LV_{MIN}$, the base station (the mobile station) supplies the mobile station (the base station) with a command for decreasing its transmission power P. Receiving the command, the mobile station (the base station) immediately decreases the transmission power P by a predetermined control step width D (step 102). If the average reception level r is less than the $LV_{MIN}$, the base station (the mobile station) does nothing. The control comes to an end. If the average bit error rate y exceeds the LV1 at the step 101 of FIG. 8, the base station (the mobile station) now compares the average bit error rate y with the second rate threshold value LV2 (step 103). If a result indicates that the average bit error rate y is not less than the LV2, another command is delivered to the mobile station (the base station) to increase its transmission power P. Receiving this command, the mobile station (the base station) immediately increases the transmission power P by the predetermined step width D (step 104). If the average bit error rate exceeds the LV1 and is below the LV2, the base station (the mobile station) carries out nothing. The control comes to an end. The control of FIG. 8 makes it possible to keep the average reception level r equal to or greater than a predetermined value with the average bit error rate y kept between the LV1 and LV2.

Reviewing FIGS. 3 and 8, the reception level detector 45 or 51 is put into operation of detecting the average reception level r. In the manner described in the foregoing, the bit error detector 47 or 53 detects the average bit error rate y. The controller 49 or 55 compares the average bit error rate y with the first rate threshold value LV1. If the average bit error rate y is not greater than the first rate threshold value LV1, the controller 49 or 55 compares the average reception level r with the predetermined minimum level $LV_{MIN}$. In this manner, the combination of the amplifier 27 or 37 and the controller 49 or 55 decreases the transmission power P only when the average reception level or is not lower than the predetermined minimum level. The combination of the amplifier 27 or 37 and the controller 49 or 55 increases the transmission power P if the average bit error rate y exceeds the first rate threshold value LV1 and furthermore if the average bit error rate y is not less than the second rate threshold value LV2. It is now readily possible to use the bit error detector 47 or 53 and the controller 49 or 55 in adaptively adjusting the first and/or the second rate threshold value LV1 and/or LV2 and to use the carrier to interference detector 47 or 53 in place of the bit error rate detector 47 or 53.

Figure 9:
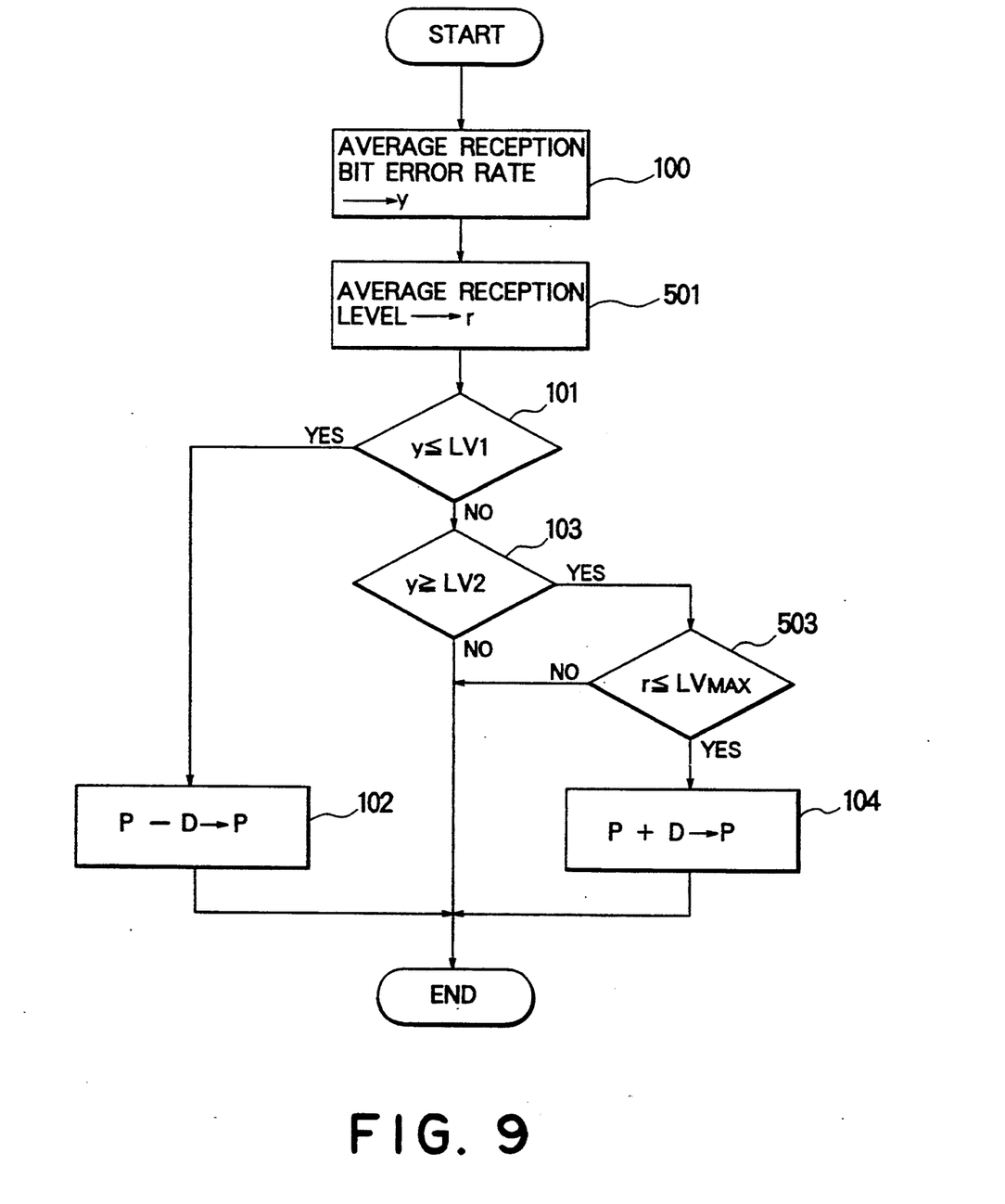
FIG. 9 is a flow chart for use in describing a transmission power control system according to a sixth embodiment of this invention.

Turning to FIG. 9, the description will proceed to a transmission power control system according to a sixth embodiment of this invention. In FIG. 9, the flow chart illustrates the sixth embodiment applied to the first embodiment of FIG. 4. The sixth embodiment is similarly applicable to the third embodiment of FIG. 6. Control of FIG. 9 is periodically carried out in the base station and the mobile station which are communicating with each other. First, the base station (the mobile station) measures an average bit error rate in a predetermined time interval t in connection with a radio communication channel in use and designates it by y (step 100). Moreover, the base station (the mobile station) measures an average reception level in the predetermined time interval with regard to the radio communication channel in use and denotes it by r (step 501). Next, the base station (the mobile station) compares the average bit error rate y with the first rate threshold value LV1 (step 101). If a result indicates that the average bit error rate y is not greater than the LV1, the base station (the mobile station) delivers to the mobile station (the base station) a command for decreasing its transmission power P. Receiving the command, the mobile station (the base station) immediately decreases the transmission power P by a predetermined step width D (step 102). If the average bit error rate y exceeds the LV1 at the step 101 of FIG. 9, the base station (the mobile station) now compares the average bit error rate y with the second rate threshold value LV2 (step 103). If a result shows that the average bit error rate y is not less than the LV2, the average reception level r is compared with a predetermined maximum level (hereafter abbreviated to $LV_{MAX}$) (step 503). If the average reception level r is not greater than the $LV_{MAX}$, another command is delivered to the mobile station (the base station) to increase its transmission power P. Receiving this command, the mobile station (the base station) immediately increases the transmission power P by the predetermined control width D (step 104). If the average reception level r exceeds the $LV_{MAX}$ at the step 503, the base station (the mobile station) does nothing. The control comes to an end. The control of FIG. 9 makes it possible to keep the average reception level r equal to or less than a predetermined level with the average bit error rate y kept between the LV1 and the LV2.

Reviewing FIGS. 2 and 9, the reception level detector 45 or 51 is used to detect the average reception level r. As above, the bit error detector 47 or 53 detects the average bit error rate y. The controller 49 or 55 successively compares the average bit error rate y with the first and the second rate threshold value LV1 and LV2. The combination of the amplifier 27 or 37 and the controller 49 or 55 decreases the transmission power P if the average bit error rate y is not greater than the first rate threshold value LV1. If the average bit error rate y exceeds the first rate threshold value LV1 and is not less than the second rate threshold value LV2, the controller 49 or 55 compares the average reception level r with the predetermined maximum level $LV_{MAX}$. The combination of the amplifier 27 or 37 and the controller 49 or 55 increases the transmission power P if the average reception level r is not higher than the predetermined maximum level $LV_{MAX}$. In the manner described by reviewing FIGS. 2 and 8, it is possible to use the bit error rate detector 47 or 53 and the controller 49 or 55 in adaptively adjusting the first and/or the second rate threshold value LV1 and/or LV2 and to substitute the carrier to interference ratio detector 47 or 53 for the bit error detector 47 or 53.

As thus far described in detail, this invention provides a transmission power control system capable of keeping the signal quality constant.

What is claimed is:

1. A transmission power control system for a mobile communication network which is of a cellular type having a service area divided into a plurality of cells and comprises in each of said cells a base station comprising a transmitter and a receiver to establish in said each of said cells a radio communication channel for carrying out communication between said base station and a mobile station comprising a transmitter and a receiver, one and the other of said base and said mobile stations being used as a transmitting station and as a counterpart station, said transmission power control system comprising in the receiver of said counterpart station:

first means for determining a bit error rate of a signal received from the transmitter of said transmitting station; and second means for producing a decreasing command to said transmitting station for decreasing transmission power of the transmitter of said transmitting station by a predetermined amount if said bit error rate if not greater than a first rate threshold value, said second means producing an increasing command to said transmitting station for increasing the transmission power of the transmitter of said transmitting station by said predetermined amount if said bit error rate is not less than a second rate threshold value which is greater than said first rate threshold value by a preselected difference, said second means producing neither of said decreasing and increasing commands if said bit error rate is greater than said first rate threshold value and less than said second rate threshold value, said second means causing the transmitter of said counterpart station to transmit said decreasing command and said increasing command towards said transmitting station;

said first means measuring the number of times by which the bit error rate of the radio communication channel in use exceeds a maximum allowable bit error rate in each predetermined time interval, said first means decreasing at least one of said first and said second rate threshold values by a prescribed value if said number of times is not less than a predetermined value, said prescribed value being less than said preselected difference, said first means increasing said at least one of said first and said second rate threshold values by said prescribed value if said number of times is less than said predetermined value.

2. A transmission power control system for a mobile communication network which is of a cellular type having a service area divided into a plurality of cells and comprises in each of said cells a base station comprising a transmitter and a receiver to establish in said each of the cells a radio communication channel for carrying out communication between said base station and a mobile station comprising a transmitter and a receiver, one and the other of said base and said mobile stations being used as a transmitting station and as a counterpart station, said transmission power control system comprising in the receiver of said counterpart station:

first means for detecting a carrier to interference ratio of a signal received from the transmitter of said transmitting station; and second means for producing a decreasing command to said transmitting station for decreasing transmission power of the transmitter of said transmitting station by a predetermined amount if said carrier to interference ratio if not less than a first ratio threshold value, said second means producing an increasing command to said transmitting station for increasing the transmission power of the transmitter of said transmitting station by said predetermined amount if said carrier to interference ratio is not greater than a second ratio threshold value which is less than said first ratio threshold value by a preselected difference, said second means producing neither of said decreasing and increasing commands if said carrier to interference ratio is less than said first ratio threshold value and greater than said second ratio threshold value, said second means causing the transmitter of said counterpart station to transmit said decreasing command and said increasing command towards said transmitting station;

said first means measuring the number of times by which the carrier to interference ratio of the radio communication channel in use is below a minimum allowable carrier to interference ratio in each predetermined time interval, said first means increasing at least one of said first and said second ratio threshold values by a prescribed value if said number of times is not less than a predetermined value, said prescribed value being less than said preselected difference, said first means decreasing said at least one of said first and said second ratio threshold values by said prescribed value if said number of times is less than said predetermined value.

* * * * *

UNITED STATES PATENT AND TRADEMARK OFFICE
CERTIFICATE OF CORRECTION

PATENT NO.   : 5,386,589
DATED        : January 31, 1995
INVENTOR(S)  : Toshihito KANAI It is certified that errors appears in the above-identified patent and that said Letters Patent is hereby corrected as shown below:

Title page :
Filed : delete "1993" insert -- 1992 --

Col. 7, line 43, delete "."

Col. 8, line 68, delete "LV1+1", insert -- $LV1 \pm 1$ --

Col. 8, line 68, delete "LV2+1", insert -- $LV1 \pm 1$ --

Col. 9, line 10 delete "LV1+1", insert -- $LV1 \pm 1$ --

Col. 9, line 11 delete "LV1+2+1", insert -- $LV2 \pm 1$ --

Signed and Sealed this

Thirteenth Day of June, 1995

Attest:

BRUCE LEHMAN

*Attesting Officer*  *Commissioner of Patents and Trademarks*